United States Patent
Ando et al.

(10) Patent No.: US 9,112,423 B2
(45) Date of Patent: Aug. 18, 2015

(54) BIDIRECTIONAL DC-DC CONVERTER AND POWER SUPPLY SYSTEM

(75) Inventors: Seiichi Ando, Hanno (JP); Ken-Ichi Iwao, Hanno (JP); Tomohiro Tanabe, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 146 days.

(21) Appl. No.: 14/002,370

(22) PCT Filed: Feb. 22, 2012

(86) PCT No.: PCT/JP2012/054326
§ 371 (c)(1),
(2), (4) Date: Aug. 30, 2013

(87) PCT Pub. No.: WO2012/121016
PCT Pub. Date: Sep. 13, 2012

(65) Prior Publication Data
US 2013/0343093 A1    Dec. 26, 2013

(30) Foreign Application Priority Data
Mar. 7, 2011    (JP) .................. 2011-049347

(51) Int. Cl.
*H02M 3/335* (2006.01)
*H02M 3/337* (2006.01)
*H02M 1/00* (2007.01)

(52) U.S. Cl.
CPC ........ *H02M 3/33584* (2013.01); *H02M 3/3376* (2013.01); *H02M 2001/0058* (2013.01); *Y02B 70/1491* (2013.01)

(58) Field of Classification Search
CPC ..................... H02M 3/33584; H02M 3/33592; H02M 1/10; H02M 3/337; H02M 3/3376
USPC .................. 363/15, 17, 19, 21.06, 21.14
See application file for complete search history.

(56) References Cited

U.S. PATENT DOCUMENTS

| 2007/0041222 A1* | 2/2007 | Eguchi et al. .................. 363/17 |
| 2011/0149610 A1* | 6/2011 | Moussaoui et al. ........ 363/21.04 |

FOREIGN PATENT DOCUMENTS

| JP | 2002-165448 | 6/2002 |
| JP | 2004-282828 | 10/2004 |
| JP | 2005-224012 | 8/2005 |
| JP | 2006-081263 | 3/2006 |
| JP | 2007-006653 | 1/2007 |

OTHER PUBLICATIONS

International Search Report for PCT/JP2012/054326, mailed on May 22, 2012, and its English translation.

* cited by examiner

*Primary Examiner* — Adolf Berhane
*Assistant Examiner* — Henry Lee, III
(74) *Attorney, Agent, or Firm* — Ladas & Parry, LLP

(57) ABSTRACT

A bidirectional DC-DC converter comprises: a first low voltage-side input/output terminal and a second low voltage-side input/output terminal; a low voltage-side rectifying circuit connected to the first low voltage-side input/output terminal and the second low voltage-side input/output terminal; a first high voltage-side input/output terminal and a second high voltage-side input/output terminal; a high voltage-side rectifying circuit connected to the first high voltage-side input/output terminal and the second high voltage-side input/output terminal; a transformer connected between the low voltage-side rectifying circuit and the high voltage-side rectifying circuit; and a controlling circuit that controls operations of switching elements in the low voltage-side rectifying circuit and the high voltage-side rectifying circuit. The controlling circuit achieves soft switching of a switching element in the high voltage-side rectifying circuit in a step-down operation.

5 Claims, 2 Drawing Sheets

BIDIRECTIONAL DC-DC CONVERTER AND POWER SUPPLY SYSTEM

CROSS REFERENCE TO RELATED APPLICATIONS

This application is the national stage of International Patent Application no. PCT/JP2012/054326, filed on Feb. 22, 2012, which claims priority from Japanese Patent Application no. 2011-049347, filed on Mar. 7, 2011, the disclosures of which are incorporated herein in their entireties.

TECHNICAL FIELD

The present invention relates to a bidirectional DC-DC converter and a power supply system.

BACKGROUND ART

Conventionally, when power is interchanged with each other in direct-current systems, for example, it is proposed to use a bidirectional DC-DC converter to achieve a high direct-current voltage with a small-scale circuit.

For example, a conventional bidirectional DC-DC converter (JP2002-165448A, for example) has bidirectional direct-current/alternating-current converting parts on the both sides of a transformer.

In a secondary-side direct-current/alternating current converting part of the bidirectional DC-DC converter, a choke coil acting as a smoothing coil is used as a choke coil of a choke coil-using chopper circuit-type inverter in forward power transmission, and a switching and rectifying part between the choke coil and a secondary coil of the transformer functions as a rectifier in forward power transmission. On the other hand, in reverse power transmission, the switching and rectifying part functions as a chopper circuit.

However, with the conventional bidirectional DC-DC converter described in the 3P2002-165448A described above, for example, in a step-down operation, a switching loss occurs because of variations in characteristics between MOS transistors serving as switching elements, and the converter efficiency decreases.

And in hard switching, problems arise that noise increases and breakdown of switching elements occurs.

DISCLOSURE OF THE INVENTION

According to an embodiment of an aspect of the present invention, a bidirectional DC-DC converter comprises:

a first low voltage-side input/output terminal and a second low voltage-side input/output terminal;

a low voltage-side rectifying circuit connected to the first low voltage-side input/output terminal and the second low voltage-side input/output terminal;

a first high voltage-side input/output terminal and a second high voltage-side input/output terminal;

a high voltage-side rectifying circuit connected to the first high voltage-side input/output terminal and the second high voltage-side input/output terminal;

a transformer connected between the low voltage-side rectifying circuit and the high voltage-side rectifying circuit; and a controlling circuit that controls operations of switching elements in the low voltage-side rectifying circuit and the high voltage-side rectifying circuit, wherein the controlling circuit achieves soft switching of a switching element in the high voltage-side rectifying circuit in a step-down operation.

In the bidirectional DC-DC converter, the low voltage-side rectifying circuit may comprise:

a first switching element connected to the first low voltage-side input/output terminal at one end thereof;

a second switching element connected to the first low voltage-side input/output terminal at one end thereof;

a third switching element connected to the other end of the first switching element at one end thereof and to the second low voltage-side input/output terminal at the other end thereof; and a fourth switching element connected to the other end of the second switching element at one end thereof and to the second low voltage-side input/output terminal at the other end thereof, and the high voltage-side rectifying circuit comprises:

a fifth switching element connected to the first high voltage-side input/output terminal at one end thereof;

a sixth switching element connected to the first high voltage-side input/output terminal at one end thereof;

a seventh switching element connected to the other end of the fifth switching element at one end thereof and to the second high voltage-side input/output terminal at the other end thereof; and an eighth switching element connected to the other end of the sixth switching element at one end thereof and to the second high voltage-side input/output terminal at the other end thereof.

In the bidirectional DC-DC converter, the transformer may comprise:

a first winding connected to the other end of the first switching element at one end thereof and to the other end of the second switching element at the other end thereof to form the transformer; and a second winding connected to the other end of the fifth switching element at one end thereof to form the transformer.

The bidirectional DC-DC converter may further comprises:

an LC resonant circuit connected between the other end of the second winding and the other end of the sixth switching element.

In the bidirectional DC-DC converter, in the step-down operation, the controlling circuit may turn on the second and third switching elements from a state where the first to eighth switching elements are turned off, and then may turn on the fifth and eighth switching elements.

In the bidirectional DC-DC converter, in the step-down operation, the controlling circuit may turn off the first to eighth switching elements, and then may turn off the second, third, fifth and eighth switching elements from the state where the second, third, fifth and eighth switching elements are turned on.

In the bidirectional DC-DC converter, in the step-down operation, the controlling circuit may turn on the first and fourth switching elements from the state where the first to eighth switching elements are turned off, and then may turn on the sixth and seventh switching elements.

In the bidirectional DC-DC converter, in the step-down operation, the controlling circuit may turn off the first to eighth switching elements, and then may turn off the first, fourth, sixth and seventh switching elements from the state where the first, fourth, sixth and seventh switching elements are turned on.

The bidirectional DC-DC converter may further comprise:
a first smoothing capacitor connected between the first low voltage-side input/output terminal and the second low voltage-side input/output terminal; and
a second smoothing capacitor connected between the first high voltage-side input/output terminal and the second high voltage-side input/output terminal.

In the bidirectional DC-DC converter, the number of turns of the second winding is greater than the number of turns of the first winding.

In the bidirectional DC-DC converter, the LC resonant circuit may comprise:
a resonant capacitor connected to the other end of the second winding at one end thereof; and
a choke coil connected to the other end of the resonant capacitor at one end thereof and to the other end of the sixth switching element at the other end thereof.

In the bidirectional DC-DC converter, the first to eighth switching elements may be MOS transistors.

In the bidirectional DC-DC converter, the first to eighth switching elements may be n-channel MOS transistors.

The bidirectional DC-DC converter may further comprise:
a first diode connected to the one end of the first switching element at a cathode thereof and to the other end of the first switching element at an anode thereof;
a second diode connected to the one end of the second switching element at a cathode thereof and to the other end of the second switching element at an anode thereof;
a third diode connected to the one end of the third switching element at a cathode thereof and to the other end of the third switching element at an anode thereof;
a fourth diode connected to the one end of the fourth switching element at a cathode thereof and to the other end of the fourth switching element at an anode thereof;
a fifth diode connected to the one end of the fifth switching element at a cathode thereof and to the other end of the fifth switching element at an anode thereof;
a sixth diode connected to the one end of the sixth switching element at a cathode thereof and to the other end of the sixth switching element at an anode thereof;
a seventh diode connected to the one end of the seventh switching element at a cathode thereof and to the other end of the seventh switching element at an anode thereof; and
an eighth diode connected to the one end of the eighth switching element at a cathode thereof and to the other end of the eighth switching element at an anode thereof.

In the bidirectional DC-DC converter, the transformer may be homopolar.

In the bidirectional DC-DC converter, the controlling circuit may apply a controlling signal to gates of the MOS transistors, thereby controls turning on and off of the MOS transistors.

According to an embodiment of an aspect of the present invention, a power supply system comprises:
a bidirectional DC-DC converter; and
a battery connected to a first low voltage-side input/output terminal of the bidirectional DC-DC converter at a positive electrode thereof and to a second low voltage-side input/output terminal of the bidirectional DC-DC converter at a negative electrode thereof,
wherein the bidirectional DC-DC converter, comprising:
a first low voltage-side input/output terminal and a second low voltage-side input/output terminal;
a low voltage-side rectifying circuit connected to the first low voltage-side input/output terminal and the second low voltage-side input/output terminal;
a first high voltage-side input/output terminal and a second high voltage-side input/output terminal;
a high voltage-side rectifying circuit connected to the first high voltage-side input/output terminal and the second high voltage-side input/output terminal;
a transformer connected between the low voltage-side rectifying circuit and the high voltage-side rectifying circuit; and
a controlling circuit that controls operations of switching elements in the low voltage-side rectifying circuit and the high voltage-side rectifying circuit,
wherein the controlling circuit achieves soft switching of a switching element in the high voltage-side rectifying circuit in a step-down operation The power supply system may further comprise:
a inverter circuit connected to the first high voltage-side input/output terminal and the second high voltage-side input/output terminal and performing conversion between a direct current and an alternating current.

In the power supply system, an alternating-current generator or a load may be connected to the inverter circuit.

In the power supply system, the low voltage-side rectifying circuit comprises:
a first switching element connected to the first low voltage-side input/output terminal at one end thereof;
a second switching element connected to the first low voltage-side input/output terminal at one end thereof;
a third switching element connected to the other end of the first switching element at one end thereof and to the second low voltage-side input/output terminal at the other end thereof; and
a fourth switching element connected to the other end of the second switching element at one end thereof and to the second low voltage-side input/output terminal at the other end thereof, and
the high voltage-side rectifying circuit comprises:
a fifth switching element connected to the first high voltage-side input/output terminal at one end thereof;
a sixth switching element connected to the first high voltage-side input/output terminal at one end thereof;
a seventh switching element connected to the other end of the fifth switching element at one end thereof and to the second high voltage-side input/output terminal at the other end thereof; and
an eighth switching element connected to the other end of the sixth switching element at one end thereof and to the second high voltage-side input/output terminal at the other end thereof.

In the power supply system, the transformer comprises:
a first winding connected to the other end of the first switching element at one end thereof and to the other end of the second switching element at the other end thereof to form the transformer; and
a second winding connected to the other end of the fifth switching element at one end thereof to form the transformer.

The power supply system may further comprise:
an LC resonant circuit connected between the other end of the second winding and the other end of the sixth switching element.

In the power supply system, in the step-down operation, the controlling circuit
may turn on the second and third switching elements from a state where the first to eighth switching elements are turned off, and then
may turn on the fifth and eighth switching elements.

In the power supply system, in the step-down operation, the controlling circuit
may turn off the first to eighth switching elements, and then may turn off the second, third, fifth and eighth switching elements from the state where the second, third, fifth and eighth switching elements are turned on.

In the power supply system, in the step-down operation, the controlling circuit may turn on the first and fourth switching elements from the state where the first to eighth switching elements are turned off, and then may turn on the sixth and seventh switching elements.

In the power supply system, in the step-down operation, the controlling circuit may turn off the first to eighth switching elements, and then may turn off the first, fourth, sixth and seventh switching elements from the state where the first, fourth, sixth and seventh switching elements are turned on.

In the power supply system, when the inverter circuit gets connected to the alternating-current generator, the bidirectional DC-DC converter may perform step-down operation.

With a bidirectional DC-DC converter according to an aspect of the present invention, in a step-down operation, a controlling circuit achieves switching of MOS transistors serving as switching elements in a low voltage-side rectifying circuit.

As a result, the bidirectional DC-DC converter can achieve switching by more appropriate partial voltage resonance.

Therefore, the switching loss due to variations in characteristics among MOS transistors serving as switching elements in a high voltage-side rectifying circuit is reduced.

That is, the converter efficiency of the bidirectional DC-DC converter is improved, occurrence of noise is reduced, and breakdown of the switching elements can be prevented.

BEST MODE FOR CARRYING OUT THE INVENTION

In the following, an embodiment of the present invention will be described with reference to the drawings.

Embodiments 1

Figure 1:
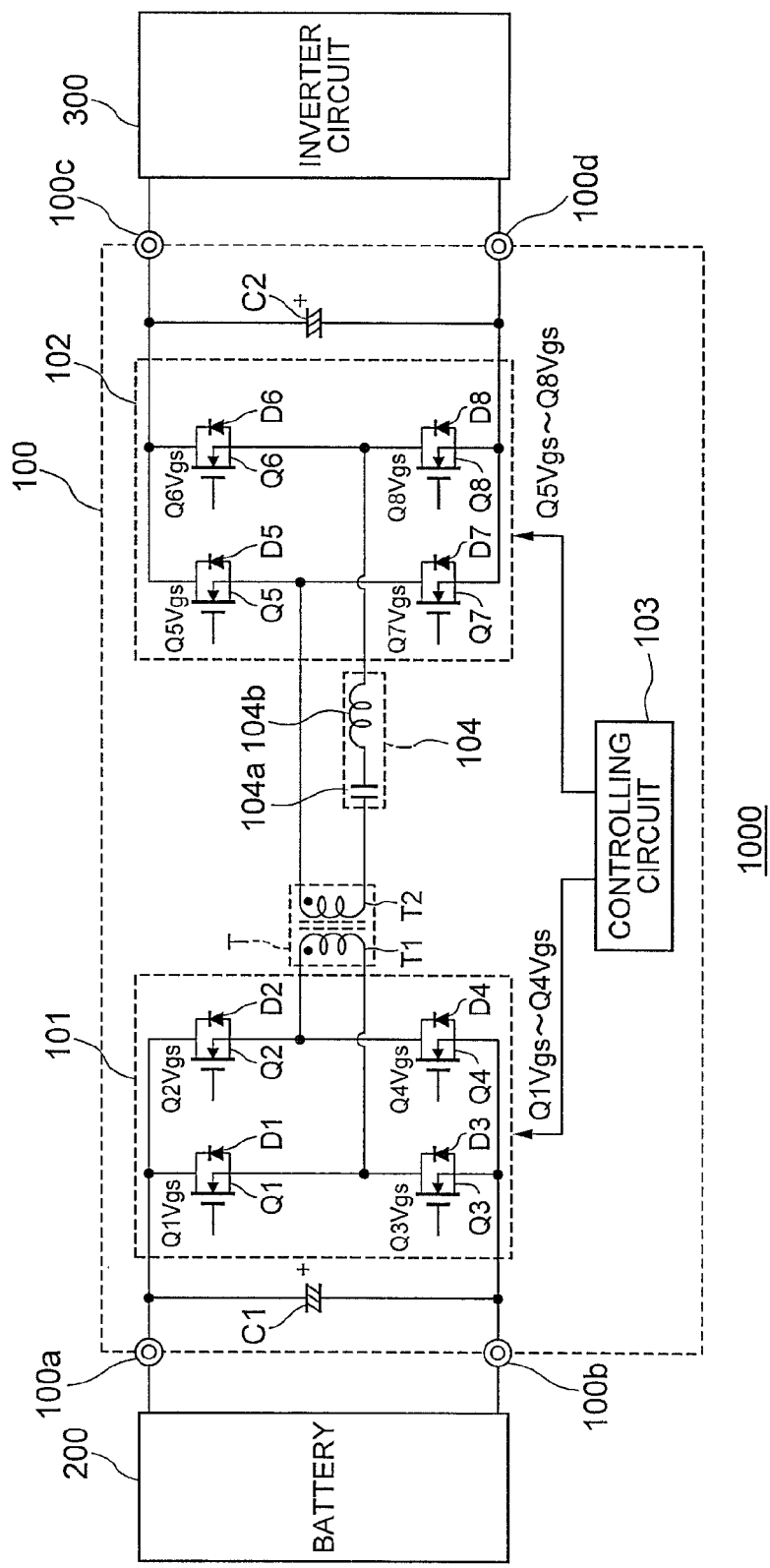
FIG. 1 is a diagram showing an example of a configuration of a power supply system 1000 according to an embodiment 1, which is an aspect of the present invention.

FIG. 1 is a diagram showing an example of a configuration of a power supply system 1000 according to an embodiment 1, which is an aspect of the present invention.

As shown in FIG. 1, the power supply system 1000 includes a bidirectional DC-DC converter 100, a battery 200 and an inverter circuit 300.

The battery 200 is connected to a first low voltage-side input/output terminal 100a of the bidirectional DC-DC converter 100 at a positive electrode thereof and to a second low voltage-side input/output terminal 100b of the bidirectional DC-DC converter 100 at a negative electrode thereof.

The inverter circuit 300 is connected to a first high voltage-side input/output terminal 100c and a second high voltage-side input/output terminal 100d of the bidirectional DC-DC converter 100 and is configured to perform conversion between a direct current and an alternating current. For example, an alternating-current generator or a load, which is not shown in the figure, is connected to the inverter circuit 300.

The bidirectional DC-DC converter 100 has the first low voltage-side input/output terminal 100a, the second low voltage-side input/output terminal 100b, the first high voltage-side input/output terminal 100c, the second high voltage-side input/output terminal 100d, a low voltage-side rectifying circuit 101, a high voltage-side rectifying circuit 102, a controlling circuit 103, an LC resonant circuit 104, a first smoothing capacitor "C1", a second smoothing capacitor "C2" and a transformer "T", for example.

The low voltage-side rectifying circuit 101 is connected to the first low voltage-side input/output terminal 100a and the second low voltage-side input/output terminal 100b.

As shown in FIG. 1, the low voltage-side rectifying circuit 101 has a first switching element "Q1", a second switching element "Q2", a third switching element "Q3" and a fourth switching element "Q4", which are n-channel MOS transistors, and a first diode "D1", a second diode "D2", a third diode "D3" and a fourth diode "D4", for example.

The first switching element "Q1" is connected to the first low voltage-side input/output terminal 100a at one end thereof.

The second switching element "Q2" is connected to the first low voltage-side input/output terminal 100a at one end thereof.

The third switching element "Q3" is connected to the other end of the first switching element "Q1" at one end thereof and to the second low voltage-side input/output terminal 100b at the other end thereof.

The fourth switching element "Q4" is connected to the other end of the second switching element "Q2" at one end thereof and to the second low voltage-side input/output terminal 100b at the other end thereof.

The first diode "D1" is connected to the one end of the first switching element "Q1" at a cathode thereof and to the other end of the first switching element "Q1" at an anode thereof.

The second diode "D2" is connected to the one end of the second switching element "Q2" at a cathode thereof and to the other end of the second switching element "Q2" at an anode thereof.

The third diode "D3" is connected to the one end of the third switching element "Q3" at a cathode thereof and to the other end of the third switching element "Q3" at an anode thereof.

The fourth diode "D4" is connected to the one end of the fourth switching element "Q4" at a cathode thereof and to the other end of the fourth switching element "Q4" at an anode thereof.

The high voltage-side rectifying circuit 102 is connected to the first high voltage-side input/output terminal 100c and the second high voltage-side input/output terminal 100d.

As shown in FIG. 1, the high voltage-side rectifying circuit 102 has a fifth switching element "Q5", a sixth switching element "Q6", a seventh switching element "Q7" and an eighth switching element "Q8", which are n-channel MOS transistors, and a fifth diode "D5", a sixth diode "D6", a seventh diode "D7" and an eighth diode "D8", for example.

The fifth switching element "Q5" is connected to the first high voltage-side input/output terminal 100c at one end thereof.

The sixth switching element "Q6" is connected to the first high voltage-side input/output terminal 100c at one end thereof.

The seventh switching element "Q7" is connected to the other end of the fifth switching element "Q5" at one end thereof and to the second high voltage-side input/output terminal 100d at the other end thereof.

The eighth switching element "Q8" is connected to the other end of the sixth switching element "Q6" at one end thereof and to the second high voltage-side input/output terminal 100d at the other end thereof.

The fifth diode "D5" is connected to the one end of the fifth switching element "Q5" at a cathode thereof and to the other end of the fifth switching element "Q5" at an anode thereof.

The sixth diode "D6" is connected to the one end of the sixth switching element "Q6" at a cathode thereof and to the other end of the sixth switching element "Q6" at an anode thereof.

The seventh diode "D7" is connected to the one end of the seventh switching element "Q7" at a cathode thereof and to the other end of the seventh switching element "Q7" at an anode thereof.

The eighth diode "D8" is connected to the one end of the eighth switching element "Q8" at a cathode thereof and to the other end of the eighth switching element "Q8" at an anode thereof.

The transformer "T" is connected to the low voltage-side rectifying circuit 101 and the high voltage-side rectifying circuit 102.

The transformer "T" is homopolar. The transformer "T" has a first winding "T1" and a second winding "T2".

The first winding "T1" is connected to the other end of the first switching element "Q1" at one end thereof and to the other end of the second switching element "Q2" at the other end thereof.

The second winding "T2" is connected to the other end of the fifth switching element "Q5" at one end thereof and to the other end of the sixth switching element "Q6" at the other end thereof.

The number of turns of the second winding "T2" is set to be greater than the number of turns of the first winding "T1".

The LC resonant circuit 104 is connected between the other end of the second winding "T2" and the other end of the sixth switching element "Q6".

The LC resonant circuit 104 has a resonant capacitor 104a connected to the other end of the second winding "T2" at one end thereof and a choke coil 104b connected to the other end of the resonant capacitor 104a at one end thereof and to the other end of the sixth switching element "Q6" at the other end thereof, for example.

The first smoothing capacitor "C1" is connected between the first low voltage-side input/output terminal 100a and the second low voltage-side input/output terminal 100b and is configured to smooth the voltage between the first low voltage-side input/output terminal 100a and the second low voltage-side input/output terminal 100b.

The second smoothing capacitor "C2" is connected between the first high voltage-side input/output terminal 100c and the second high voltage-side input/output terminal 100d and is configured to smooth the voltage between the first high voltage-side input/output terminal 100c and the second high voltage-side input/output terminal 100d.

The controlling circuit 103 is configured to control operations of the switching elements "Q1" to "Q8" in the low voltage-side rectifying circuit 101 and the high voltage-side rectifying circuit 102. More specifically, the controlling circuit 103 applies a controlling signal to gates of the MOS transistors serving as the first to eighth switching elements "Q1" to "Q8", thereby controls turning on and off of the first to eighth switching elements (MOS transistors) "Q1" to "Q8".

For example, the controlling circuit 103 is configured to achieve soft switching of the switching elements in the high voltage-side rectifying circuit 102 in a step-down operation (that is, a state where the inverter circuit 300 is connected to the alternating-current generator and is supplied with electricity), for example, as described later.

Next, an example of an operation of the bidirectional DC-DC converter 100 in the power supply system 1000 configured as described above in the step-down operation will be described.

Figure 2:
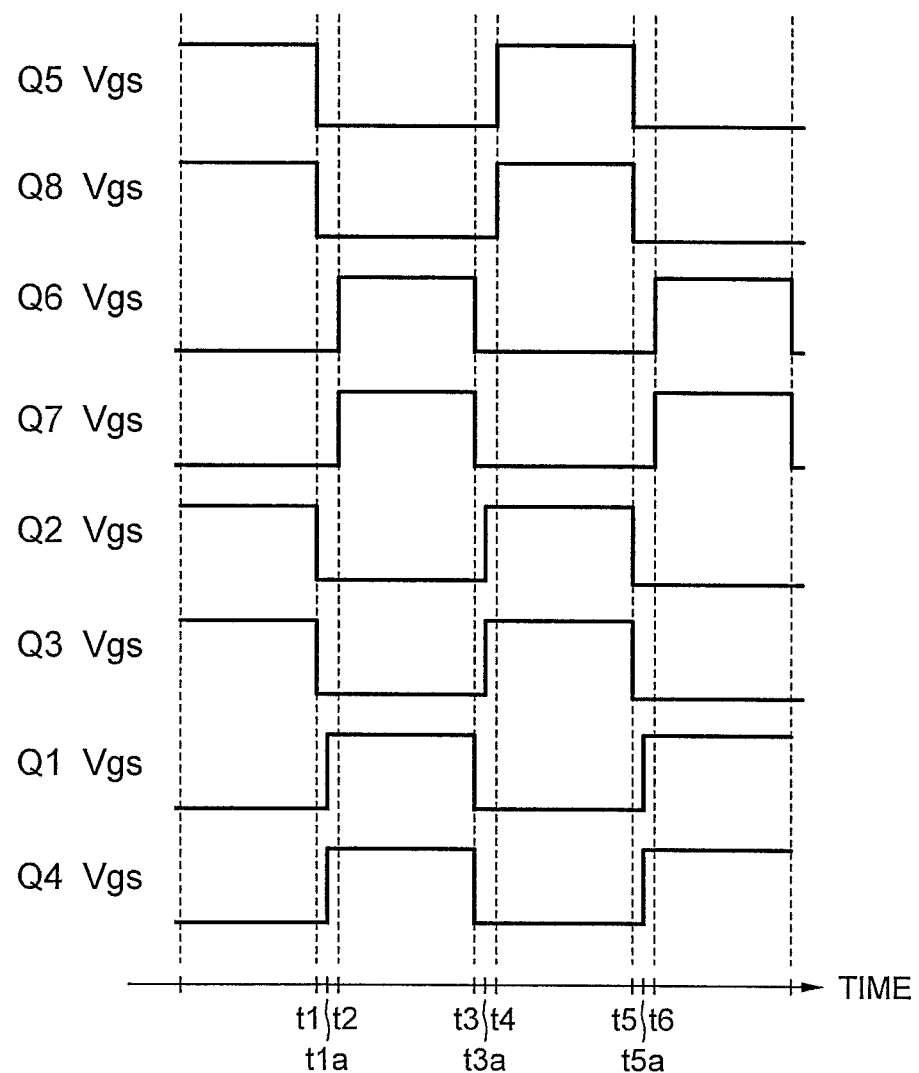
FIG. 2 is a waveform diagram showing examples of controlling signals input to the gates of the MOS transistors in the low voltage-side rectifying circuit 101 and the high voltage-side rectifying circuit 102 in the bidirectional DC-DC converter 100 shown in FIG. 1 in the step-down operation.

FIG. 2 is a waveform diagram showing examples of controlling signals input to the gates of the MOS transistors in the low voltage-side rectifying circuit 101 and the high voltage-side rectifying circuit 102 in the bidirectional DC-DC converter 100 shown in FIG. 1 in the step-down operation.

As shown in FIG. 2, for example, at a time "t1" in the step-down operation, the controlling circuit 103 sets controlling signals (voltages applied to the gates of each of the n-channel MOS transistors) "Q1Vgs" to "Q8Vgs" at a "Low" level. In this way, the controlling circuit 103 turns off the first to eighth switching elements "Q1" to "Q8".

Then, at a time "t1a", the controlling circuit 103 sets the controlling signal "Q1Vgs" and "Q4Vgs" at a "High" level from the state described above, thereby turning on the first and fourth switching elements "Q1" and "Q4" in the low voltage-side rectifying circuit 101.

Then, at a time "t2", the controlling circuit 103 sets the controlling signal "Q6Vgs" and "Q7Vgs" at the "High" level, thereby turning on the sixth and seventh switching elements "Q6" and "Q7" in the high voltage-side rectifying circuit 102.

As a result, a current flows to the sixth switching element "Q6", the LC resonant circuit 104, the second winding "T2" and the seventh switching element "Q7". As a result, the transformer "T" starts operating, and a current flows to the first switching element "Q1", the first winding "T1" and the fourth switching element "Q4".

That is, the first and fourth switching elements "Q1" and "Q4" in the low voltage-side rectifying circuit 101 are turned on earlier than the sixth and seventh switching element "Q6" and "Q7" in the high voltage-side rectifying circuit 102 (the voltage of the battery that is originally output is inverse-transformed through the first and fourth switching elements "Q1" and "Q4" and the first winding "T1" toward the second winding "T2". In the sixth and seventh switching elements (high voltage switching elements) "Q6" and "Q7", the drain-source voltage "Vds" becomes 0 V earlier than the gate signal, and the soft switching operation is processed).

As a result, the converter efficiency is improved, occurrence of noise is reduced, and breakdown of the switching elements can be prevented.

Then, at a time "t3", the controlling circuit 103 sets the controlling signals "Q1Vgs", "Q4Vgs", "Q6Vgs" and "Q7Vgs" at the "Low" level, thereby turning off the first, fourth, sixth and seventh switching elements "Q1", "Q4", "Q6" and "Q7".

Then, at a time "t3a", the controlling circuit 103 sets the controlling signal "Q2Vgs" and "Q3Vgs" at the "High" level, thereby turning on the second and third switching elements "Q2" and "Q3" in the low voltage-side rectifying circuit 101.

Then, at a time "t4", the controlling circuit 103 sets the controlling signal "Q5Vgs" and "Q8Vgs" at the "High" level, thereby turning on the fifth and eighth switching elements "Q5" and "Q8" in the high voltage-side rectifying circuit 102.

As a result, a current flows to the fifth switching element "Q5", the LC resonant circuit 104, the second winding "T2" and the eighth switching element "Q8". As a result, the transformer "T" starts operating, and a current flows to the second switching element "Q2", the first winding "T1" and the third switching element "Q3".

That is, the second and third switching elements "Q2" and "Q3" in the low voltage-side rectifying circuit 101 are turned on earlier than the fifth and eighth switching element "Q5" and "Q8" in the high voltage-side rectifying circuit 102 (the voltage of the battery that is originally output is inverse-transformed through the second and third switching elements "Q2" and "Q3" and the first winding "T1" toward the second winding "T2". In the fifth and eighth switching elements (high voltage switching elements) "Q5" and "Q8", the drain-source voltage "Vds" becomes 0 V earlier than the gate signal, and the soft switching operation is processed).

As a result, the converter efficiency is improved, occurrence of noise is reduced, and breakdown of the switching elements can be prevented.

Then, at a time "t5", the controlling circuit 103 sets the controlling signals "Q2Vgs", "Q3Vgs", "Q5Vgs" and "Q8Vgs" at the "Low" level, thereby turning off the second, third, fifth and eighth switching elements "Q2", "Q3", "Q5" and "Q8".

Then, at a time "t5a", the controlling circuit 103 sets the controlling signal "Q1Vgs" and "Q4Vgs" at the "High" level, thereby turning on the first and fourth switching elements "Q1" and "Q4" in the low voltage-side rectifying circuit 101.

Then, at a time "t6", the controlling circuit 103 sets the controlling signal "Q6Vgs" and "Q7Vgs" at the "High" level, thereby turning on the sixth and seventh switching elements "Q6" and "Q7" in the high voltage-side rectifying circuit 102.

As a result, a current flows to the sixth switching element "Q6", the LC resonant circuit 104, the second winding "T2" and the seventh switching element "Q7". As a result, the transformer "T" starts operating, and a current flows to the first switching element "Q1", the first winding "T1" and the fourth switching element "Q4".

That is, the first and fourth switching elements "Q1" and "Q4" in the low voltage-side rectifying circuit 101 are turned on earlier than the sixth and seventh switching element "Q6" and "Q7" in the high voltage-side rectifying circuit 102 (the voltage of the battery that is originally output is inverse-transformed through the first and fourth switching elements "Q1" and "Q4" and the first winding "T1" toward the second winding "T2". In the sixth and seventh switching elements (high voltage switching elements) "Q6" and "Q7", the drain-source voltage "Vds" becomes 0 V earlier than the gate signal, and the soft switching operation is processed).

As a result, the converter efficiency is improved, occurrence of noise is reduced, and breakdown of the switching elements can be prevented.

Then, the same operation is repeated.

As described above, in the bidirectional DC-DC converter 100 according to an aspect of the present invention, in the step-down operation, the controlling circuit 103 achieves soft switching of the MOS transistors serving as the switching elements in the high voltage-side rectifying circuit 102.

As a result, the bidirectional DC-DC converter 100 can achieve switching by more appropriate partial voltage resonance.

Therefore, the switching loss due to variations in characteristics among the MOS transistors serving as the switching elements in the high voltage-side rectifying circuit is reduced.

That is, the converter efficiency of the bidirectional DC-DC converter 100 is improved, occurrence of noise is reduced, and breakdown of the switching elements can be prevented.

Although a case where the switching elements are n-channel MOS transistors has been described in the embodiment as an example, the same description holds true for a case where the switching elements are p-channel MOS transistors.

The embodiment is given for illustrative purposes, and the scope of the present invention is not limited thereto.

The invention claimed is:
1. A bidirectional DC-DC converter, comprising:
a first low voltage-side input/output terminal and a second low voltage-side input/output terminal;
a low voltage-side rectifying circuit connected to the first low voltage-side input/output terminal and the second low voltage-side input/output terminal;
a first high voltage-side input/output terminal and a second high voltage-side input/output terminal;
a high voltage-side rectifying circuit connected to the first high voltage-side input/output terminal and the second high voltage-side input/output terminal;
a transformer connected between the low voltage-side rectifying circuit and the high voltage-side rectifying circuit; and
a controlling circuit that controls operations of switching elements in the low voltage-side rectifying circuit and the high voltage-side rectifying circuit, wherein the controlling circuit achieves soft switching of a switching element in the high voltage-side rectifying circuit in a step-down operation,
wherein the low voltage-side rectifying circuit comprises:
a first switching element connected to the first low voltage-side input/output terminal at one end thereof;
a second switching element connected to the first low voltage-side input/output terminal at one end thereof;
a third switching element connected to the other end of the first switching element at one end thereof and to the second low voltage-side input/output terminal at the other end thereof; and
a fourth switching element connected to the other end of the second switching element at one end thereof and to the second low voltage-side input/output terminal at the other end thereof;
wherein the high voltage-side rectifying circuit comprises:
a fifth switching element connected to the first high voltage-side input/output terminal at one end thereof;
a sixth switching element connected to the first high voltage-side input/output terminal at one end thereof;
a seventh switching element connected to the other end of the fifth switching element at one end thereof and to the second high voltage-side input/output terminal at the other end thereof; and
an eighth switching element connected to the other end of the sixth switching element at one end thereof and to the second high voltage-side input/output terminal at the other end thereof;
wherein the transformer comprises:
a first winding connected to the other end of the first switching element at one end thereof and to the other end of the second switching element at the other end thereof to form the transformer; and
a second winding connected to the other end of the fifth switching element at one end thereof to form the transformer; and
wherein, in the step-down operation, the controlling circuit turns on the second and third switching elements from a state where the first to eighth switching elements are turned off, and then turns on the fifth and eighth switching elements; and in the step-down operation, the controlling circuit turns off the first to eighth switching elements, and then turns off the second, third, fifth and eighth switching elements from the state where the second, third, fifth and eighth switching elements are turned on.

2. The bidirectional DC-DC converter according to claim 1, further comprising:
   a LC resonant circuit connected between the other end of the second winding and the other end of the sixth switching element.

3. The bidirectional DC-DC converter according to claim 1, wherein in the step-down operation, the controlling circuit turns on the first and fourth switching elements from the state where the first to eighth switching elements are turned off, and then turns on the sixth and seventh switching elements.

4. The bidirectional DC-DC converter according to claim 3, wherein in the step-down operation, the controlling circuit turns off the first to eighth switching elements, and then turns off the first, fourth, sixth and seventh switching elements from the state where the first, fourth, sixth and seventh switching elements are turned on.

5. The bidirectional DC-DC converter according to claim 1, further comprising:
   a first smoothing capacitor connected between the first low voltage-side input/output terminal and the second low voltage-side input/output terminal; and
   a second smoothing capacitor connected between the first high voltage-side input/output terminal and the second high voltage-side input/output terminal.

* * * * *